Patented Jan. 1, 1929.

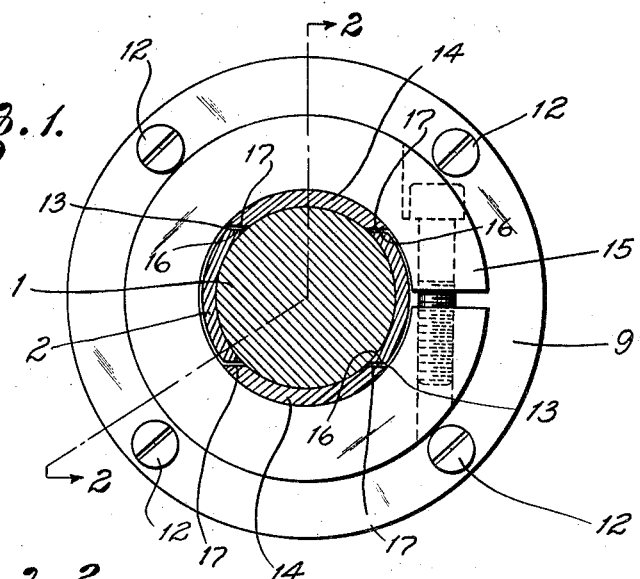
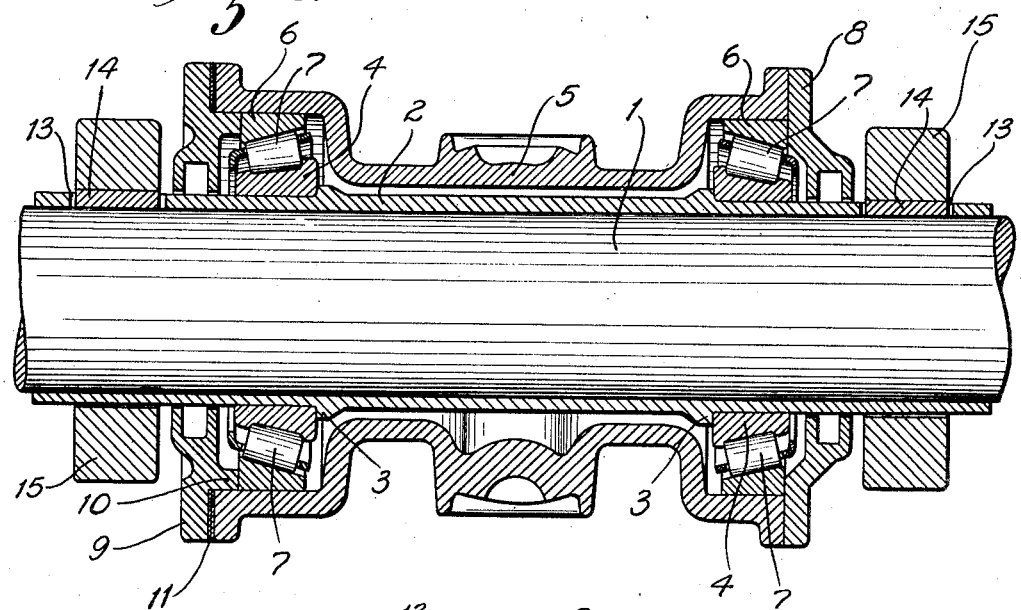
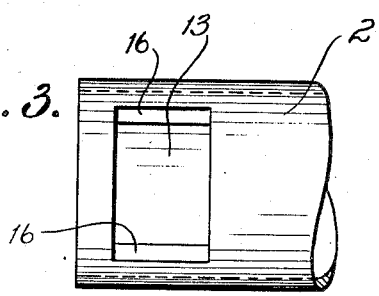

1,696,972

UNITED STATES PATENT OFFICE.

RUSSELL P. PROFFITT, OF ST. LOUIS, MISSOURI, ASSIGNOR TO THE TIMKEN ROLLER BEARING COMPANY, OF CANTON, OHIO, A CORPORATION OF OHIO.

SHAFT-HANGER BEARING.

Application filed December 2, 1926. Serial No. 152,074.

My invention relates to shaft hanger bearings and has for its principal object a construction in which the shaft is free to move or creep endwise in the bearings without disturbing the adjustment of the bearings, in which the mounting member for the inner bearing members is secured to the shaft so as to rotate therewith while accommodating said endwise movement of the shaft and which minimizes the risk of said mounting member splitting at the ends or pulling away from the shaft.

Many hanger bearing constructions have been devised in the effort to satisfactorily meet the peculiar conditions under which such constructions operate. Due to variations of temperature and to other causes, the elongation or endwise movement of shafting is very considerable; and many constructions have been devised to accommodate such movement. The present invention accurately positions the bearings and, at the same time, provides a mounting sleeve therfor that accommodates endwise movement of the shaft without any tendency of the mounting sleeve to split at the ends or pull away from the shaft. The invention consists principally in mounting the inner bearing members on a sleeve that has openings therethrough adjacent to each end, plugs or curved pieces of greater thickness than the mounting sleeve and of smaller size than said openings being inserted in said openings and being held by means of suitable clamping collars. The invention further consists in the shaft hanger bearing and in the parts and combinations and arrangements of parts herinafter described and claimed.

In the accompanying drawing, wherein like reference characters indicate like parts wherever they occur, Fig. 1 is a part end elevation, part sectional view of a shaft hanger bearing embodying my invention;

Fig. 2 is a sectional view on the line 2—2 in Fig. 1; and

Fig. 3 is a detail view of the end portion of the bearing mounting sleeve showing the opening in which the curved plug is mounted.

The drawing illustrates a line shaft hanger box construction. A shaft 1 extends through a sleeve 2 and is free to move endwise therein. Mounted on said sleeve 2 and abutting against shoulders 3 thereon are the cones 4 or inner bearing members of antifriction bearings, conical roller bearings being illustrated in the drawing. Surrounding said sleeve 2 and spaced therefrom is a hanger box 5 in whose ends are mounted the cups 6 or outer bearing members of the conical roller bearings, the conical rollers 7 being interposed between said cups 6 and cones 4. At one end, a closure ring 8 is provided for the opening in the hanger box, said closure ring contacting with the end of the bearing cup 6. At the other end, a similar closure ring 9 is provided, said closure ring 9 having an inwardly projecting annular rib 10 that abuts against the bearing cup. Shims 11 are interposed between said closure ring 9 and the end of the hanger box 5 and both sets of bearings may be adjusted by changing the number of said shims. The closure rings are secured to the hanger box by suitable means, as by screws 12.

Near each end, the bearing mounting sleeve 2 is provided with openings 13 therethrough. The drawing shows two diametrically opposite openings 13 at each end of the sleeve 2. Mounted in each of said openings is a curved plug 14 or plate that conforms to the shape of the opening 13 and of the shaft 1 and bearing mounting sleeve 2. Said plugs 14 may be slightly smaller in length than the length of the openings 13 (that is, they may be shorter than the dimension of said openings circumferentially of the sleeve). The plugs 14 are likewise less in width than the width of said openings 13 (that is, the dimension of said plugs axially of the sleeve 2 is smaller than the dimension of said openings 13 axially of the sleeve). In the drawings, the difference between axial dimensions is greater than the difference between circumferential dimensions, the difference between the dimensions allowing for the axial movement of the shaft.

The plugs 14 are of greater thickness than the mounting sleeve 2. Said plugs are secured in position by means of a clamping collar 15 at each end of the mounting sleeve 2. When said clamping collars 15 are drawn up tight, they engage the plugs 14, but do not touch the mounting sleeve, by reason of said sleeve being thinner than said plugs. Thus, by reason of the engagement of said plugs 14 with the end walls of their sleeve openings 13, rotary movement of the shaft is transmitted to the bearing mounting sleeve. Axial movement of the shaft 1 is permitted by reason of the fact that the plugs 14 are narrower than the openings 13 in which they are placed. The end walls 16 of said openings and the end edges 17 of said plugs are preferably made so that they will contact flatwise with each other when the shaft rotates. The driving pressure will be at one end or the other of said openings, depending on the direction of rotation of the shaft. If said walls 16 and end edges 17 extend chordally, as illustrated, the driving edges of the plugs overlap the end walls of said openings and hold the sleeve against the shaft as well as drive the shaft. There is no tendency for the ends of the sleeves to split or pull away from the shaft, there are no projections on the end of the sleeve to be broken off, the plugs may be adjusted so that both exert an equal driving pressure, the bearings are firmly held in place, and axial movement of the shaft is accommodated. Obviously numerous changes may be made without departing from the invention and I do not wish to be limited to the precise construction shown.

What I claim is:

1. A shaft hanger bearing comprising a shaft, a hanger box, a bearing mounting sleeve, anti-friction bearings interposed between said hanger box and mounting sleeve, said mounting sleeve being provided with diametrically spaced openings near its ends, plugs in said openings, said plugs being thicker than said mounting sleeve and having edge portions overlapping said sleeve, and a clamping collar at each end for securing said plugs on said shaft to rotate therewith.

2. A shaft hanger bearing comprising a shaft, a hanger box, a bearing mounting sleeve, anti-friction bearings interposed between said hanger box and said mounting sleeve, said mounting sleeve being provided with diametrically spaced openings near its ends, plugs in said openings, said plugs being thicker than said mounting sleeve and narrower than the openings in which they are placed, and clamping collars for securing said plugs on said shaft to rotate therewith, said clamping collars engaging said plugs and being spaced away from said sleeve.

3. In a shaft hanger bearing construction comprising a hanger box, a bearing mounting sleeve and anti-friction bearings interposed therebetween, said mounting sleeve being provided with enlarged openings near each end, means for securing said mounting sleeve so as to cause it to rotate with said shaft and permit endwise movement of said shaft in said sleeve, said means comprising plugs inserted in said sleeve openings, said plugs being thicker than said sleeve and being narrower than the openings in said sleeve.

4. In a shaft hanger bearing construction comprising a hanger box, a bearing mounting sleeve and antifriction bearings interposed therebetween, said mounting sleeve being provided with diametrically spaced openings near each end, means for securing said mounting sleeve so as to cause it to rotate with said shaft and to permit endwise movement of said shaft in said sleeve, said means comprising plugs inserted in said sleeve openings, said plugs being thicker than said sleeve and being narrower than the openings in said sleeve and a clamping collar at each end engaging said plugs and spaced from said sleeve.

5. In a shaft hanger bearing construction comprising a hanger box, a bearing mounting sleeve and anti-friction bearings interposed therebetween, said mounting sleeve being provided with diametrically spaced openings near each end, means for securing said mounting sleeve so as to cause it to rotate with said shaft and to permit endwise movement of said shaft in said sleeve, said means comprising plugs inserted in said sleeve openings, said plugs being thicker than said sleeve and being narrower than the openings in said sleeve, the end edges of said plugs overlapping the end walls of said sleeve openings, and a clamping collar at each end engaging said plugs and spaced from said sleeve.

Signed at St. Louis, Missouri, this 29th day of November, 1926.

RUSSELL P. PROFFITT.